United States Patent [19]
Goscenski, Jr.

[11] 3,818,781
[45] June 25, 1974

[54] DIFFERENTIAL GEAR MECHANISM

[75] Inventor: Edward J. Goscenski, Jr., Battle Creek, Mich.

[73] Assignee: Eaton Corporation, Cleveland, Ohio

[22] Filed: Jan. 2, 1973

[21] Appl. No.: 320,440

[52] U.S. Cl. .................................. 74/711, 192/35
[51] Int. Cl. ......................... F16h 1/44, F16d 13/04
[58] Field of Search ....... 74/711; 192/35, 92 A, 108

[56] References Cited
UNITED STATES PATENTS

| | | | |
|---|---|---|---|
| 3,330,169 | 7/1967 | Carrico et al. | 74/711 |
| 3,404,585 | 10/1968 | Roper | 192/93 A |
| 3,572,165 | 3/1971 | Roper | 192/93 A |
| 3,605,523 | 9/1971 | O'Brien | 74/711 |
| 3,606,803 | 9/1971 | Ottemann | 74/711 |

Primary Examiner—Samuel Scott
Assistant Examiner—P. S. Lall
Attorney, Agent, or Firm—Teagno & Toddy

[57] ABSTRACT

A differential mechanism comprises a differential gear means including an input gear and a pair of output gears. A locking mechanism locks up the differential in response to a predetermined amount of differentiating action occurring. The locking mechanism functions to lock one of the output gears to the case of the differential. An actuator mechanism is provided for actuating the locking mechanism to effect the lockup of the differential gear means. The actuator mechanism includes a member which rotates during normal differentiating action and a latch member for preventing rotation of the member upon the differentiating action reaching a predetermined magnitude. A cam member rotates with the rotatable member and operates on the latch member to hold the latch member out of latching position when differentiating action is at a low level. If the differentiating action increases to a predetermined magnitude, the cam member is incapable of holding the latch member out of latching position, and the latch member moves into latching position to engage a latch portion on the rotating member so as to prevent further rotation thereof. This prevention of further rotation of the member effects lockup of the differential.

11 Claims, 5 Drawing Figures

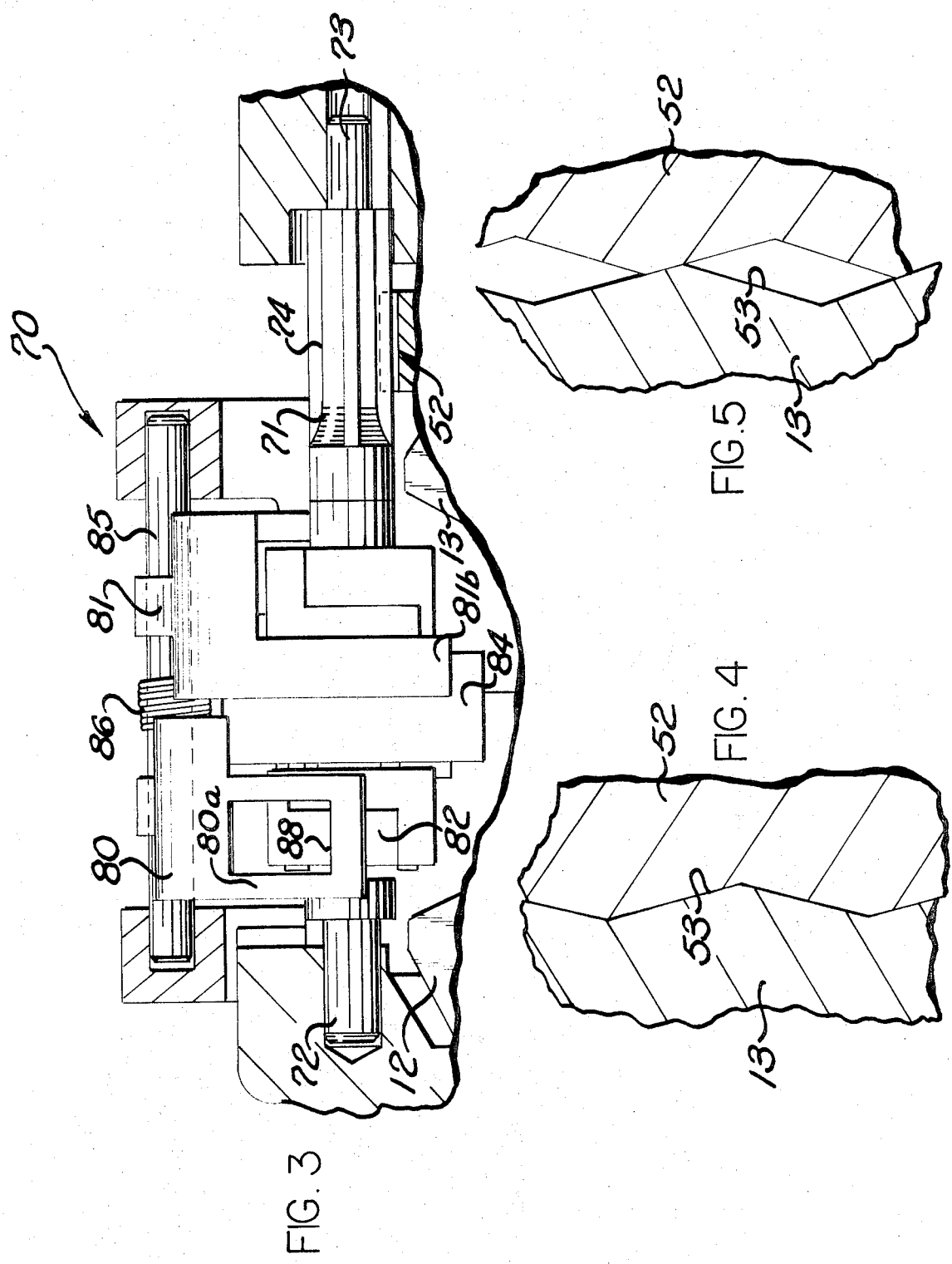

3,818,781

DIFFERENTIAL GEAR MECHANISM

BACKGROUND OF THE INVENTION

The present invention relates to a locking-type differential gear mechanism, and in particular relates to an actuator mechanism for actuating the lock up of a differential gear mechanism. Locking differential gear mechanisms are well known. Such differentials are used as interaxle differentials such as in a four-wheel drive, as well as interwheel differentials interposed between the wheels on a common axle. The locking-type of differential mechanisms which are known in the art normally include a mechanism for locking two rotatable parts of the differential together. The specific locking mechanism may and has in the art taken many different forms and generally is a clutch mechanism such as a disc pack, cone clutch, etc. The known locking-type differential mechanisms also include an actuator or engagement mechanism for actuating the locking mechanism to effect the lock up of the two differential parts.

Ottemann U.S. Pat. No. 3,606,803 discloses a typical known locking-type differential in which the side gear of the differential is locked through a suitable clutch mechanism to the case of the differential upon the occurrence of a predetermined degree of differential action. When the differentiating action reaches a predetermined degree, an actuator mechanism is operated which actuates the clutch mechanism to effect lockup. In U.S. Pat. No. 3,606,803, for example, the clutch mechanism is actuated upon relative rotation of the side gear and a cam member. The cam member is retarded from rotation with the side gear by operation of the actuating mechanism. The actuating mechanism comprises a series of weights which are thrown out upon a predetermined amount of differential action occurring and, when thrown out, are latched from rotating, and accordingly effect a retarding action on the cam member which in turn results in the side gear rotating relative to the cam member, which then actuates the clutch mechanism for locking the side gear to the case of the differential. The weights are carried by a rotating member which rotates in response to differential action occurring, and, of course, the weights are thrown out when the differential action reaches a predetermined amount, as noted above.

In the Ottemann patent 3,606,803, the actuator mechanism is mounted on the differential case and may be actuated to cause engagement of the clutch to lock the differential due to case centrifugal force as opposed to merely differentiating action occurring. Also, the actuator mechanism which includes weights which are thrown out and then latched is subject to the problem of the possibility of the weights missing and not being latched. In copending application Ser. No. 304,616, filed Nov. 8, 1972 and assigned to the assignee of the present invention, an actuator mechanism is disclosed which is directed to the solution of certain of these problems in the Ottemann construction.

SUMMARY OF THE PRESENT INVENTION

The present invention is also directed to an improvement in the actuator for a lockup differential, which actuator effects actuation of the lockup mechanism or clutch of the differential. The actuator mechanism embodying the present invention is not subjected to the problem of missing actuation, as in the structure disclosed in the afore-mentioned Ottemann patent. Moreover, the actuator mechanism of the present invention is not subjected to the problem of possible engagement due to case centrifugal force, even though no differentiating action is occurring.

More specifically, the present invention provides an actuator mechanism which applies a retarding force to a cam member which actuates the lockup mechanism for the differential. During normal operation, the cam member rotates along with the side gear for driving one of the outputs of the differential. When there is a sufficient amount of differentiating action indicating a wheel slip condition, the side gear rotates relative to the cam member a sufficient distance so that a camming force between the side gear and cam member results in axial movement of the cam member relative to the side gear to effect actuation of the lockup mechanism, which in the present embodiment is disclosed as a disc pack which acts between the cam mechanism or the side gear and the case of the differential. The actuator mechanism of the present invention provides a retarding force on the cam member so that the cam member is restricted from rotating with the side gear on differential action occurring.

The actuator mechanism of the present invention specifically includes a member which is carried by the differential case and which rotates about its own axis in response to differential action occurring. That member has a driving engagement with the cam member and when it is stopped from rotation, the cam member shifts relative to the side gear so as to effect an axial loading of the cam and thereby effect lockup of the differential. The actuator mechanism includes a latch member which effects a locking of the rotating member so as to retard rotation of the rotating member when differentiating action reaches a predetermined magnitude. In this connection, the rotating member has a latch projection or portion and a latch bracket is associated with the rotating member and engages the latch portion thereof to prevent rotation of the rotating member when the differential action reaches a predetermined degree.

During normal differentiating action, a spring biases the latch bracket into engagement with another cam member carried by the rotating member and which other cam member maintains the latch bracket out of latching position with respect to the latching portion of the rotating member. However, when differentiating action reaches a sufficient degree, the latch bracket can no longer follow the cam and the latch bracket begins to float, at which time the latching portion of the rotating member can no longer clear the latch bracket and as a result the latch bracket engages the latching portion on the rotating member and thereby stops the rotating member. This stopping, as noted above, effects lockup of the differential.

DESCRIPTION OF THE DRAWINGS

Further features and advantages of the present invention will be apparent from the detailed description of a preferred embodiment thereof made with reference to the accompanying drawings in which:

FIG. 3 is an enlarged fragmentary sectional view of a portion of the differential of FIG. 1; and FIGS. 4 and 5 are somewhat schematic views of a portion of the differential of FIG. 1 showing parts in different positions.

DESCRIPTION OF THE PREFERRED EMBODIMENT

The present invention provides an improved differential mechanism of the lockup type, and particularly provides an improved locking actuator mechanism for a locking-type differential. As noted hereinabove, locking differentials are used as limited slip differentials between wheels of a vehicle and which function when one wheel of the vehicle slips to transmit the torque to the nonslipping wheel. Such differentials are also usable interaxle in four-wheel drive vehicles. In such an environment, the differential operates in the event a wheel on one axle is slipping to transmit the torque to the nonslipping wheels on the other axle. The embodiment of the invention disclosed in FIGS. 1–5 and generally designated 10 comprises a differential mechanism which is utilized as an interaxle differential in a four-wheel drive vehicle.

Figure 1:
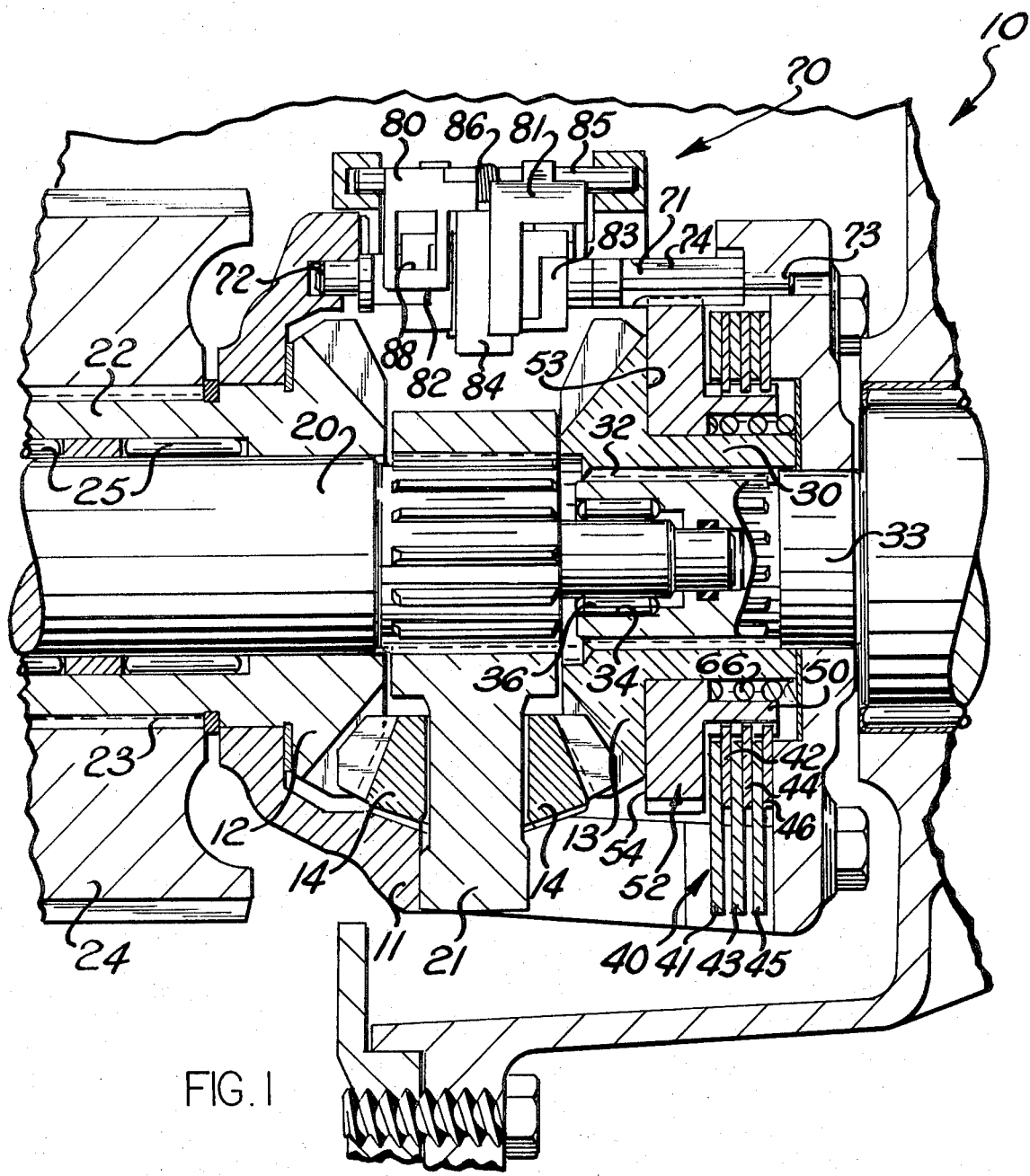
FIG. 1 is an axial sectional view of a differential mechanism embodying the present invention.

The differential 10 which is illustrated in FIG. 1 includes a differential case 11, a pair of side gears 12 and 13 and pinion gears, one of which is designated 14. The side gears 12, 13 and pinion gears 14 are all located in the gear chamber defined by case 11. The pinions 14, of course, mesh with the side gears 12 and 13.

The input drive to the differential 10 is through a shaft 20 which is drivingly connected with the transmission of the vehicle. The shaft 20 projects into the case 11 and on its inner end has a cross-shaft or stubshaft 21 thereon, which extends transversely of the shaft 20 and on which the pinions 14 are rotatably mounted. The shaft 21 is connected to the case 11, and on rotation of shaft 20, shaft 21, pinions 14 and case 11 are rotated therewith about the axis of shaft 20.

As the pinions 14 are rotated, torque is transmitted thereby to the side gears 12 and 13 through the meshing gear teeth of the pinions and side gears. The side gear 12 has a hub portion 22 which is splined at 23. The splined portion 23 is provided for connection to a suitable drive member, such as a gear or sprocket 24 which in turn is drivingly connected in a suitable manner to drive the front wheels of the vehicle. The side gear 12 has a central opening therethrough and is supported by the shaft 20. which extends through the opening of the side gear and into the case 11. Suitable needle bearings 25 encircle the shaft 20 and support the side gear 12 thereon for rotation relative thereto.

The side gear 13 has a hub portion 30. The hub portion 30 of the side gear 13 is internally splined at 32 and is drivingly connected with a splined shaft 33. The shaft 33 extends to the rear wheels of the vehicle and constitutes the input drive for the rear wheels of the vehicle. The shaft 33 has a counterbored opening 34 therein at its end adjacent the side gear 13. A portion of the drive shaft 20 projects into the counterbored opening 34 in the shaft 33 and a suitable bearing 36 is interposed between the counterbored opening 34 and the shaft 20 to provide for relative rotation between the shaft 20 and the shaft 33.

From the above, it should be apparent that upon engagement of the transmission of the vehicle the drive shaft 20 drives pinions 14 therewith as well as the case 11, and the pinions 14 due to their meshing engagement with side gears 12 and 13 transmit the drive to the side gears 12 and 13 which in turn effects the driving of the front and rear wheels, respectively, of the vehicle.

As noted above, the differential 10 which embodies the present invention is a locking-type differential which functions to transmit the torque to one of the side gears 12 or 13 if the other of the side gears begins spinning at too high a rate. To this end, the differential 10 includes a locking mechanism for effecting a locking of the side gear 13 to the differential case 11. The locking mechanism is generally designated 40, as shown in FIG. 1.

The mechanism 40 may take a variety of different constructions. In the embodiment of FIG. 1, the locking mechanism 40 comprises a clutch disc pack. The disc pack includes a plurality of discs which are designated 41-46. The discs 41, 43 and 45 are suitably keyed to the case 11. Disc 42 is interposed between the discs 41 and 43, while disc 44 is interposed between discs 43 and 45. Disc 46 is interposed between disc 45 and the case 11. Discs 42, 44 and 46 are all keyed to a hub portion 50 of a cam member 52. It should be obvious that if the disc pack is actuated in order to establish a frictional engagement between the various discs, the frictional engagement will cause a transmission of torque from the case 11 directly to the cam member 52 and through the cam member to the side gear 13, thereby locking the side gear 13 and case together.

The mechanism or disc pack 40, as noted hereinabove, functions to lock the case 11 to the side gear 13 so as to retard or prevent differentiating action when so actuated. The disc pack 40 is actuated by axial loading of the disc pack 40 in response to a predetermined level of differentiating action occurring. This axial loading is effected by the cam 52 which moves axially of the side gear 13 to load the disc pack 40 when the differentiating action achieves a predetermined level. The axial movement of the cam 52 is effected by cam teeth which are formed on the face of the side gear 13 and cooperating cam teeth 54 formed on the adjacent face of the cam member 52. These cooperating cam teeth are better shown in an enlarged schematic view in FIG. 4.

When the cam 52 and side gear 13 are in their predetermined or desired position and normal differentiating action is occurring, the gear 13 and cam 52 have their cooperating cam teeth in the position illustrated in FIG. 4 where the teeth or cam surfaces on the gear 13 and cam 52 are in a cooperating meshing engagement. In the event, however, that the cam 52 and gear 13 rotate relative to each other, the cam surfaces are shifted to a position, as shown in FIG. 5. In this position, the cam 52 is moved or cammed axially of the side gear 13 by the cooperating cam teeth. The axial movement of the cam 52 causes an axial loading of the disc pack 40 so as to effect a locking of the differential so as to thereby retard differential action.

When the cam 52 moves axially, it moves in opposition to spring 66 which is interposed between the case 11 and the cam member 52 and which biases the cam member toward the left, as viewed in FIG. 1, so as to tend to cause the cam teeth 53, 54 on the side gear 13 and cam 52 to take the position shown in FIG. 4. The spring 66 will, of course, return the cam 52 to the normal engaged position, as shown in FIG. 4, with the side gear 13 when the force holding the cam member 52 is removed.

As shown in FIG. 1, a substantial axial space is illustrated as existing between the cam member 52 and the disc 41. This space is shown at that location merely for purposes of illustration, since the space may be distributed between the various discs in the disc pack 40 rather than being in one specific location. The space is shown in the drawings in this way in order to show that there is a certain amount of axial movement necessary for the cam 52 to effect a loading of the disc pack 40 and that prior to that movement the disc pack is not axially loaded, but rather the discs are relatively free to rotate with respect to each other.

From the above, it should be apparent that upon relative rotation of the side gear 13 and the cam 52, the cam 52 is moved axially to actuate the disc pack to effect lockup of the differential. In accordance with the present embodiment of the invention, a suitable mechanism is provided to provide for relative rotation of the side gear 13 and cam 52 when a predetermined amount of differentiation occurs. When the amount of differentiation is below that predetermined amount, the cam 52 and gear 13 are not actuated to effect axial loading of the locking mechanism 40. Above that predetermined amount of relative rotation, the locking mechanism 40 is actuated to lock up the differential.

In accordance with the present invention an improved actuator mechanism is provided and generally designated 70. The actuator mechanism 70 functions to actuate the locking mechanism 40 and specifically functions to provide for relative rotation of the cam 52 and side gear 13 so as to effect the axial loading of the disc pack 40 and the locking up of the differential. The actuator mechanism 70 includes a member 71 which is in the form of a shaft which is supported at its opposite ends 72 and 73 for rotation about its own axis relative to the case 11. The shaft 71 has a splined portion 74 which meshes with a spline or gear portion on the outer periphery of the cam 52. When no differentiating action is occurring, the member 71 rotates about the axis of the shaft 20 along with the case 11 and side gear 13 and cam member 52, and the member 71 does not rotate about its own axis. However, when differentiating action is initiated, the side gear and therefore the cam member 52 rotates relative to the case 11 and due to the geared relationship between the cam member 52 and the shaft 71, the shaft 71 is rotated about its own axis. The direction of rotation of the shaft will depend, of course, on whether the case 11 or the cam 52 is rotating faster.

When a predetermined amount of differentiating action occurs, the shaft 71 is locked from further rotation about its own axis, and the cam member 52 is thereby locked from rotation. The side gear 13 thus rotates relative to the cam member 52 to effect the axial movement of the cam member 52 and loading of the disc pack 40. This locking of the shaft member 71 is effected by a mechanism which comprises a pair of latch brackets 80 and 81, a pair of projecting latch members 82 and 83 for cooperation with the latch brackets 80, 81, respectively, and a cam member 84 for preventing latching of the member 71 at low levels of rotation thereof.

The latch members 82 and 83 are carried on the shaft 71 and rotate therewith. The cam member 84 likewise is carried on the shaft 71 and rotates with the shaft 71.

Figure 2:
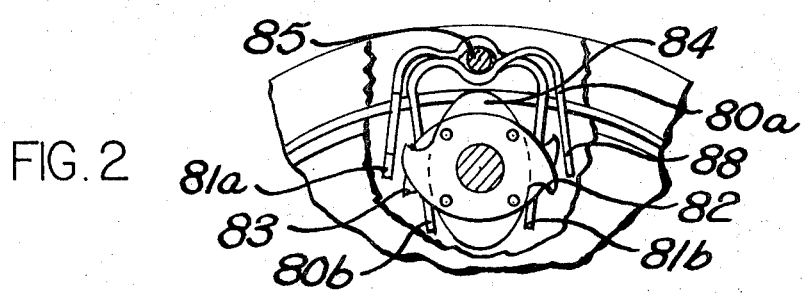
FIG. 2 is a fragmentary view of a portion of the differential shown in FIG. 1.

The latch brackets 80 and 81 are generally U-shaped members, best shown in FIG. 2, and have a base portion carried on a rod member 85 for pivoting movement about the axis of the rod 85. Each latch bracket 80, 81 has a pair of legs which extends from the base portion and to opposite sides of the shaft 71. The pair of legs on the latch bracket 80 is designated 80a and 80b, while the pair of legs on the latch bracket 81 is designated 81a and 81b.

The latch brackets 80, 81 and the cooperating latch portions 82, 83 carried by the cam 71 effect a locking of the shaft 71 from rotation in respective directions of rotation of the member 71. The latch portion 82 and the latch bracket 80 cooperate to lock the shaft 71 in one direction and in the same manner as does the latch bracket 81 and cooperating latch portion 83 cooperate for the opposite direction of rotation of the shaft 71. Accordingly, only the latch bracket 80 and cooperating latch portion 82 will be described in detail hereinbelow.

The latch bracket 80 is spring loaded by a suitable torsion spring 86 biasing the leg 80b thereof into engagement with the cam member 84 which is carried and rotates with the member 71. The spring 86 also biases the leg 80a in a direction out of the path of rotation of the latch portion 82. The leg 80a of the latch bracket 80 has an opening 88 therein and which is adapted to receive the projecting latch portion 82 if the leg 80a does not move clear thereof. When the projecting latch portion of the latch member 82 is received in the opening 80a, rotation of the shaft 71 ceases and lockup of the differential occurs.

At low differential speeds, the spring member 86 holds the latch bracket 80 and specifically the leg 80b thereof against the cam 84 carried by and rotatable with shaft 71, and the cam member 84 is designed and operates in cooperation with spring 86 so as to permit the latch portion of the bracket 80, namely, leg portion 80a thereof to miss the latching portion 82 of the cam shaft. In other words, as the cam member 84 rotates, it engages the legs of the latch bracket 80 to effect pivoting movement of the latch bracket 80 in such a manner that the projecting latch portion 83 does not engage in the opening 88 of the leg 80a of the latch bracket 80. However, as the differential speed increases, the latch bracket 80 can no longer follow the cam 84 and the latch bracket begins to float in an intermediate position, at which time the latching portion of the cam shaft, namely, portion 82 thereof, can no longer clear the leg 80a of the latch bracket. As a result, the projecting latch portion is received in the opening 88 in the leg 80a of the latching bracket. As a result, the latch bracket 80 stops rotation of the shaft 71 which thereby retards rotation of the cam member 52 and effects lockup of the differential due to axial movement of the cam member 52 effecting axial loading of the disc pack 40.

If desired, a friction clutch, not shown, may be interposed between the latch member 83 and the shaft 71 so that the locking force or retarding force is transmitted through that friction clutch to the shaft 71. Such a clutch mechanism is interposed between the locking mechanism and actuator in Ottemann U.S. Pat. No. 3,606,803 and reference may be made thereto for a description of such. Further description thereof will not be made herein, since such a clutch does not form a part of the present invention.

Moreover, it should be apparent that the latch brackets 80 and 81 can be constructed in such a way that their center of gravity coincides with their center of rotation and, if such is the case, centrifugal force acting on the latch brackets 80 and 81 would have no effect on their operation.

From the above, it should be apparent that applicant has provided a new and unique locking-type differential mechanism as well as a unique actuator for effecting lockup of the locking differential.

Having described my invention, I claim:

1. A differential gear mechanism comprising a differential gear case defining a gear chamber, differential gear means located in said gear chamber, said differential gear means including at least one input gear and a pair of output gears, lockup means for locking up said differential gear means to retard differentiating action, and actuating means for actuating said lockup means, said actuating means including a shaft member rotatable about its own axis upon differentiating action occurring with its speed of rotation being a function of the amount of differentiating action occurring, and means engageable with said shaft member when said shaft member achieves a predetermined rotational speed for retarding rotation thereof, said means for retarding rotation of said shaft member comprising a latch bracket supported by said case and a latch portion on said shaft member engageable with said latch bracket upon said predetermined rotational speed being achieved, and means rotatable with said shaft member and engageable with said latch bracket on rotation of said shaft member for preventing engagement of said latch bracket with said latch portion at speeds of rotation of said shaft member below said predetermined speed.

2. A differential as defined in claim 1 wherein said means for preventing engagement of said latch bracket comprises a cam member rotatable with said shaft member and engageable with a portion of said latch bracket to prevent engagement of said latch bracket and said latch portion at speeds of rotation of said shaft member below said predetermined speed.

3. A differential mechanism as defined in claim 1 wherein said latch bracket comprises a U-shaped member having a base and two legs projecting therefrom, means connected to said base and supporting said U-shaped member for pivotal movement relative to said shaft member, one of said legs having a locking portion cooperable with said latch portion on said shaft member to lock said shaft member from rotation when engaged.

4. A differential mechanism as defined in claim 3 wherein said means for preventing engagement of said latch bracket comprises a cam member rotatable with said shaft member and engageable with the other of said legs to effect pivoting of said latch bracket relative to said case.

5. A differential mechanism as defined in claim 4 wherein said locking portion of said one leg comprises an opening in said one leg in which said latch portion on said shaft member is received to effect locking of said shaft member.

6. A differential mechanism as defined in claim 5 further including spring means biasing said other leg into engagement with said cam member and said one leg out of the path of rotation of said latch portion and at rotational speeds of said shaft member above said predetermined speed said U-shaped member "floats" and said one leg remains in the path of rotation of said latch porton.

7. A differential gear mechanism as defined in claim 1 wherein said means for retarding rotation of said shaft member comprises a pair of latch brackets supported by said case and a respective latch portion rotatable with said shaft member, one latch bracket and latch portion cooperating to retard rotation of said shaft member in one direction and the other latch bracket and latch portion cooperating to retard rotation of said shaft member in the other direction of rotation thereof.

8. A differential gear mechanism as defined in claim 1 wherein said lock-up means comprises a clutch mechanism which locks said differential case with one of said gear means and said actuating means for effecting said lockup further includes a cam member which moves axially to actuate the clutch mechanism when rotation of said shaft member is retarded.

9. A differential gear mechanism as defined in claim 8 wherein said cam member and one of said output gears have cooperating cam surfaces which effect said axial movement of said cam member upon relative rotation of said cam member and said output gear and said cam member and said shaft member have a driving connection therebetween whereby retarding rotation of said shaft member retards rotation of said cam member.

10. In a differential gear mechanism having a differential gear case defining a gear chamber, differential gearing in said gear chamber, and clutch means for locking up the differential gear means, the improvement comprising actuator means for actuating the clutch means, said actuator means comprising a shaft member rotatable about its own axis upon differentiating action occurring with its speed of rotation being a function of the amount of differentiating action occurring, means engageable with said shaft member when said shaft member achieves a predetermined rotational speed for retarding rotation thereof, said means for retarding rotation of said shaft member comprising a latch bracket supported by said case and a latch portion fixed on said shaft member engageable with said latch bracket upon said predetermined rotational speed being achieved, and means for preventing engagement of said latch bracket with said latch portion at speeds of rotation of said shaft member below said predetermined speed, said means for preventing engagement of said latch bracket comprises a cam member rotatable with said shaft member and engageable with a portion of said latch bracket to prevent engagement of said latch bracket and said latch portion at speeds of rotation of said shaft member below said predetermined speed.

11. In a differential gear mechanism as defined in claim 10 wherein said latch bracket comprises a U-shaped member having a base and two legs projecting therefrom, means connected to said base and supporting said U-shaped member for pivotal movement relative to said shaft member, one of said legs having a locking portion cooperable with said latch portion on said shaft member to lock said shaft member from rotation when engaged.

* * * * *